(12) United States Patent
Teramoto et al.

(10) Patent No.: US 7,298,269 B2
(45) Date of Patent: Nov. 20, 2007

(54) IMAGE TAKING APPARATUS HAVING SELECTIVELY ENABLED IC TAGS

(75) Inventors: Tougo Teramoto, Wakayama (JP); Shinichi Ban, Kobe (JP); Katsuyuki Nanba, Sakai (JP); Toshihiro Hamamura, Yokohama (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 201 days.

(21) Appl. No.: 11/202,702

(22) Filed: Aug. 12, 2005

(65) Prior Publication Data

US 2006/0163339 A1 Jul. 27, 2006

(30) Foreign Application Priority Data

Jan. 27, 2005 (JP) ............................ 2005-019761

(51) Int. Cl.
*G08B 13/14* (2006.01)
(52) U.S. Cl. .............................. 340/572.1; 340/572.8; 340/686.1; 235/492; 348/207.99
(58) Field of Classification Search .. 340/572.1–572.8, 340/626.1, 686.2, 686.4; 348/207.99; 235/375, 235/492
See application file for complete search history.

(56) References Cited

U.S. PATENT DOCUMENTS 5,587,700 A * 12/1996 Williams .................... 340/541
6,008,727 A * 12/1999 Want et al. ............... 340/572.1
6,127,938 A * 10/2000 Friedman .................. 340/693.6
2003/0227550 A1* 12/2003 Manico et al. ......... 348/207.99

FOREIGN PATENT DOCUMENTS

JP    2003-174578 A    6/2003

* cited by examiner

Primary Examiner—Jeffery Hofsass
Assistant Examiner—Hoi C. Lau
(74) Attorney, Agent, or Firm—Sidley Austin LLP (57) ABSTRACT

A metallic sliding cover that covers an image taking lens system when an image taking apparatus is not in use is attached at the front side of the image taking apparatus, and an IC tag of a type that has an internal power supply and an IC tag of a type that has not an internal power supply are stuck to the front side of the image taking apparatus. A plural number of IC tags are alternatively covered with the sliding cover by movement of the cover. Thereby, communication only by one IC tag becomes possible when the image taking apparatus is in use; meanwhile, communication only by the other IC tag becomes possible when the image taking apparatus is not in use. As a result, interference between a plurality of IC tags having mutually different characteristics can be prevented.

18 Claims, 6 Drawing Sheets

| PRODUCT NAME : × × × × |
|---|
| SERIAL NUMBER : ○○○○ |
| PRODUCTION DATE : ○×△ |
| . . . . |

Fig. 9

IMAGE TAKING APPARATUS HAVING SELECTIVELY ENABLED IC TAGS

This application is based on the application No. 2005-19761 filed in Japan, the contents of which are hereby incorporated by reference.

BACKGROUND OF THE INVENTION

1. Field of the Invention

The present invention relates to an image taking apparatus equipped with a plural number of IC tags.

2. Description of the Related Art

In the field of physical distribution management, instead of a bar code label stuck on a commodity, an IC tag by which information transmission through radio communication is possible (which is also called a wireless tag) has become used. As an application of the IC tag, a technology of acquiring information of a photographic subject from an IC tag held by the subject by using a digital camera has been proposed.

On the other hand, IC tags are divided into one type that has not an internal power supply in the IC tag but transmits information memorized in the IC tag by using the energy of the radio wave sent from an external reader/writer (this type is called the passive type hereafter), and another type that has an internal power supply in the IC tag and can actively transmit information memorized in the IC tag (this type is called the active type hereafter).

The passive type IC tag has an advantage in that it can communicate if the power supply of an apparatus having the IC tag malfunctions (when a battery is not loaded, for example), or even if the apparatus is broken. On the contrary, the passive type IC tag has disadvantages in that it generally provides a short communication distance and has a small data capacity to be memorized. Although the active type IC tag has advantages, as compared to the passive type IC tag, in that its communication distance is long and has a large data capacity to be memorized, it is expensive.

Since the active and passive type IC tags having mutually different characteristics have merits and demerits, respectively, it may be reasonable to use both types together in order to utilize advantages of them. However, if both type IC tags are merely used together, a problem may arise that interference occurs by both type IC tags responded to the radio wave from the reader, so that the reader side cannot receive correct information from the IC tags.

SUMMARY OF THE INVENTION

In order to solve problems described above, the image taking apparatus comprises: a movable member for moving between a first position and a second position in accordance with a condition of the image taking apparatus; a first IC tag for memorizing information concerning the imaging taking apparatus and that is disposed at a position where is covered with the movable member at said second position and where is not covered with the movable member at said first position; and a second IC tag for memorizing information concerning the imaging taking apparatus and that is disposed at a position where is covered with the movable member at said first position and where is not covered with the movable member at said second position.

In the following description, like parts are designated by like reference numbers throughout the several drawings.

DETAILED DESCRIPTION OF THE PREFERRED EMBODIMENTS

<Structure of the Image Taking Apparatus>

Figure 1:
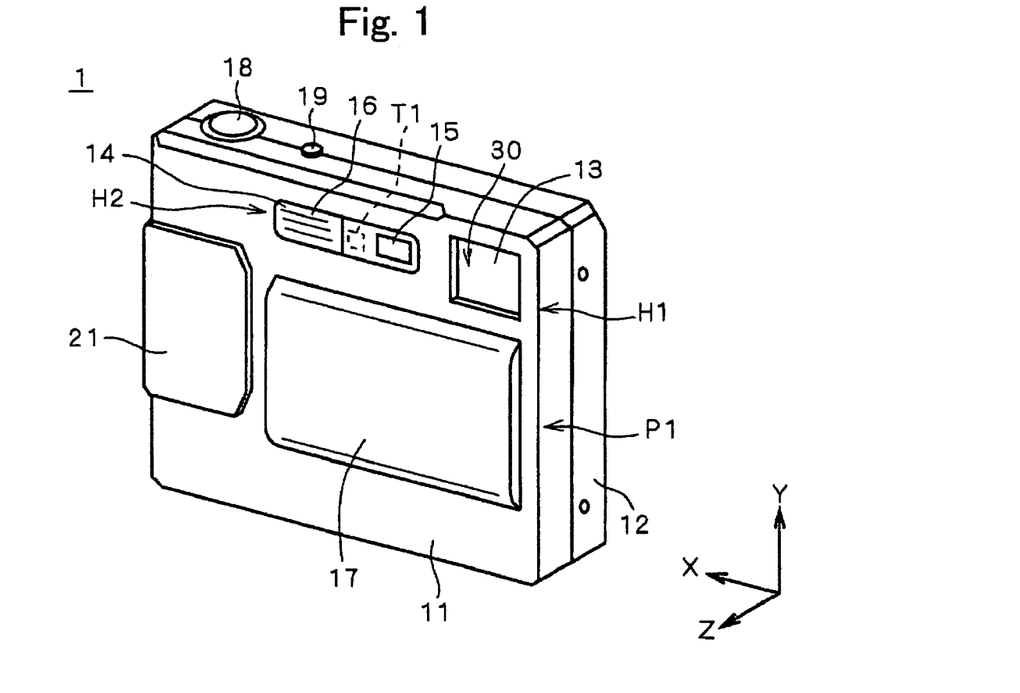
FIG. 1 is a perspective view showing the external structure of an image taking apparatus 1.
Figure 2:
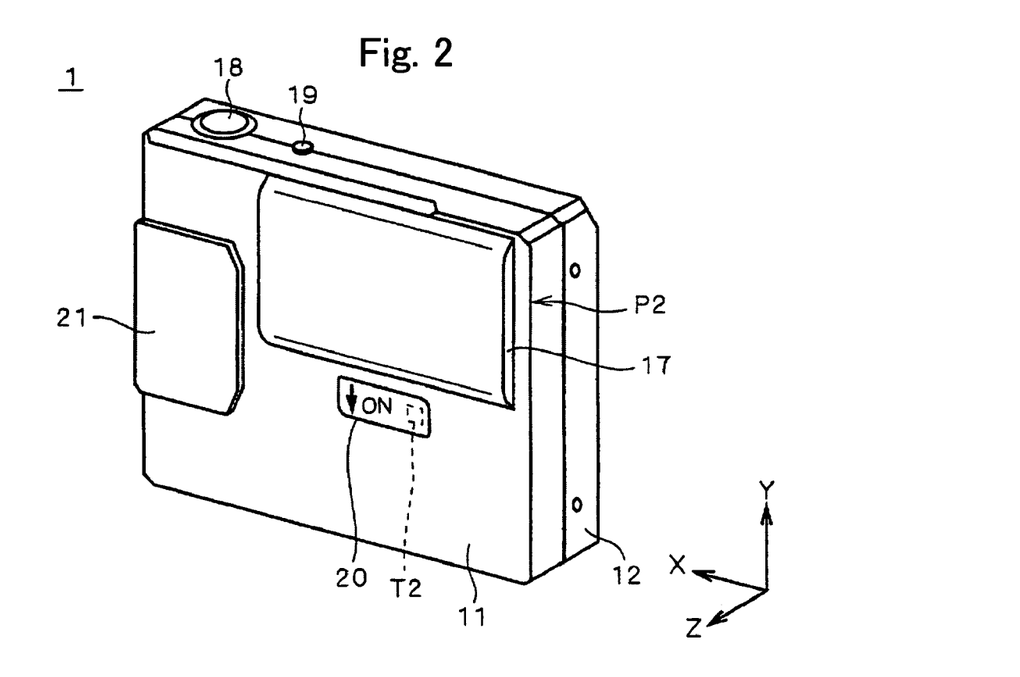
FIG. 2 is a perspective view showing the external structure of the image taking apparatus 1.

FIGS. 1 and 2 are perspective views showing the external structure of the image taking apparatus 1. FIG. 1 shows the status when the image taking apparatus 1 is in use, and FIG. 2 shows the status when the image taking apparatus 1 is not in use.

The image taking apparatus 1 is composed as a digital camera, for example, of which a metallic front cover 11 and a metallic rear cover 12 form a housing.

Two apertures H1 and H2 are formed on the front cover 11. The aperture H1 is formed so that it guides the light from a photographic subject to an image taking lens system 30, and a transparent window 13 made from a plastic, for example, is fit on the aperture. Similarly, a transparent window 14 made from a plastic is fit on the aperture H2. Behind the window 14, both a finder 15 and a photoflash 16 are equipped. At the rear side of the window 14, an IC tag T1 which will be described later is stuck between positions of the finder 15 and the photoflash 16.

On the front cover 11, a metallic sliding cover 17 which is movable in the direction of the Y-axis (in FIG. 1) is attached. While the sliding cover 17 is placed at the use position P1 (in FIG. 1) when the image taking apparatus 1 is in use for shooting a subject, for example, when the image taking apparatus 1 is not in use it is placed at the nonuse position P2 (in FIG. 2) that is located above the use position P1, so that it covers the apertures H1 and H2. Accordingly, when the sliding cover 17 moves from the use position P1 to the nonuse position P2, a seal 20 stuck on the front cover 11 is exposed. At the rear side of the seal 20, an IC tag T2 (which will be described later) having different characteristics from the IC tag T1 is formed.

On the upper surface of the image taking apparatus 1, a release button 18 for ordering shooting and a power switch 19 for turning on and off the power supply of the image taking apparatus 1 are equipped.

On the side of the image taking apparatus 1, a grip portion 21 for a photographer to hold the image taking apparatus 1 is formed. The grip portion 21 works as a rid that covers a battery room in the image taking apparatus 1 in which a battery is loaded.

Figure 3:
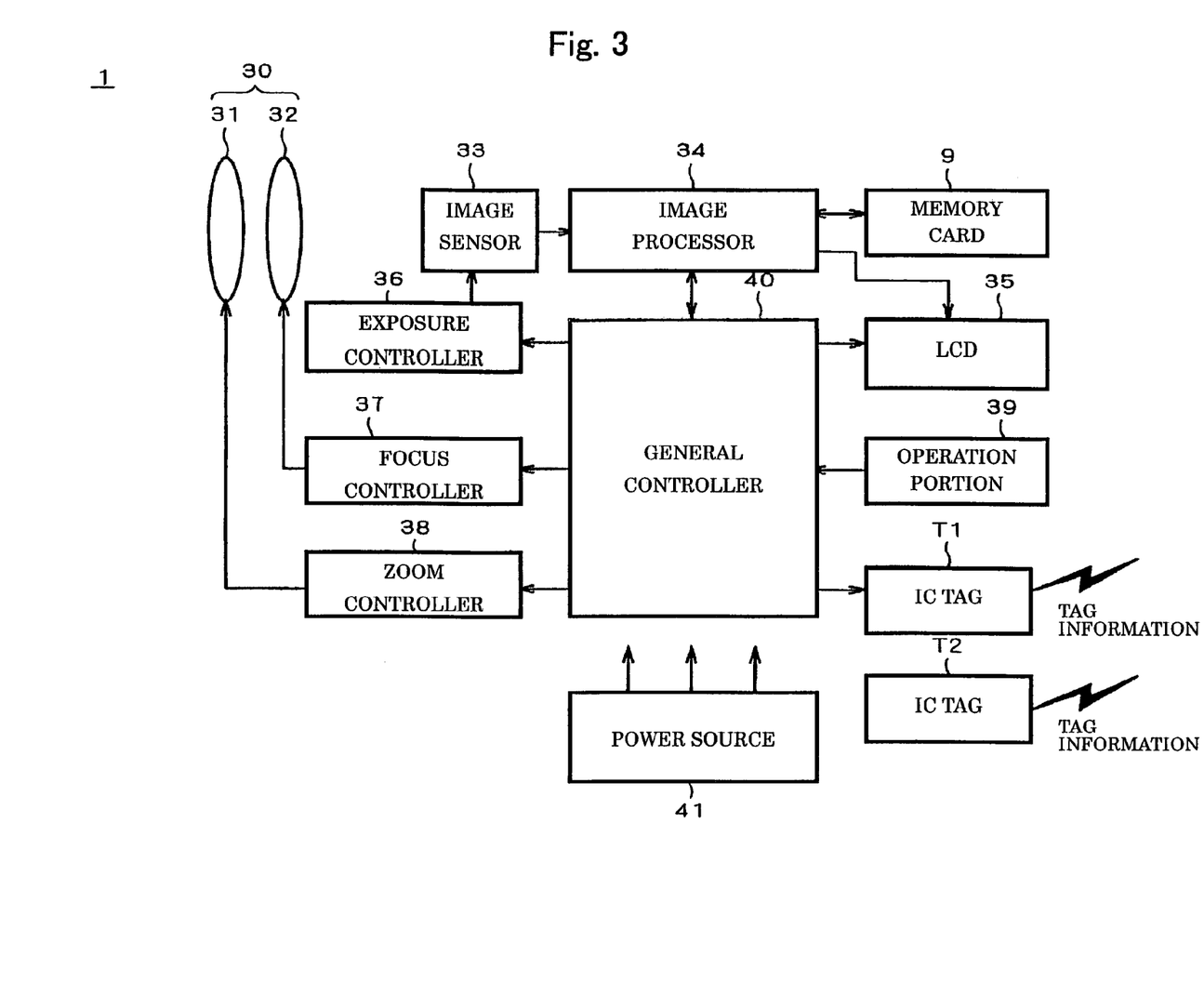
FIG. 3 is a block diagram showing the functional structure of the image taking apparatus 1.

FIG. 3 is a block diagram showing the functional structure of the image taking apparatus 1.

In the image taking apparatus 1, the light from the photographic subject enters into an image sensor 33 through the image taking lens system 30 that is equipped behind the window 13. The image taking lens system 30 has a zoom lens 31 and a focusing lens 32.

The image sensor 33 is equipped with an aperture diaphragm and an image sensing device that is composed as a CCD, for example, and performs photoelectric conversion of the light image of the photographic subject formed by the image taking lens system 30, so as to generate an image signal.

The image signal generated by the image sensor 33 is inputted into an image processor 34. Then, in the image processor 34, processes such as A/D conversion, white balance correction, and gamma correction are performed. The image data processed in the image processor 34 is recorded in a recording medium (a memory card 9, for example) which is detachable to the image taking apparatus 1, or displayed on an LCD (Liquid Crystal Display) 35. By the LCD 35, preview displaying of the photographic subject or replay displaying of the recorded image is possible.

An exposure controller 36 controls the aperture diaphragm in the image sensor 33 and the exposure time of the image sensing device based on the control signal from a general controller 40.

A focus controller 37 drives the focusing lens 32 based on a focus detection result obtained by the general controller 40.

A zoom control portion 38 drives the zoom lens 31 in order to change the focal length of the image taking lens system 30.

An operation portion 39 has the release button 18 and a power switch 19 both of which are already described, a record/replay mode selection switch equipped on the rear cover 12 (not illustrated), and others, and accepts operational inputs generated by a photographer.

The general controller 40 has a CPU which work as a computer and a memory so that it can totally control each part of the image taking apparatus 1. The general controller 40 also controls information transmission from the IC tag T1 as will be described later.

A power source 41 supplies electric power to each portion of the image taking apparatus 1 by using a battery.

<IC Tags T1 and T2>

Figure 4:
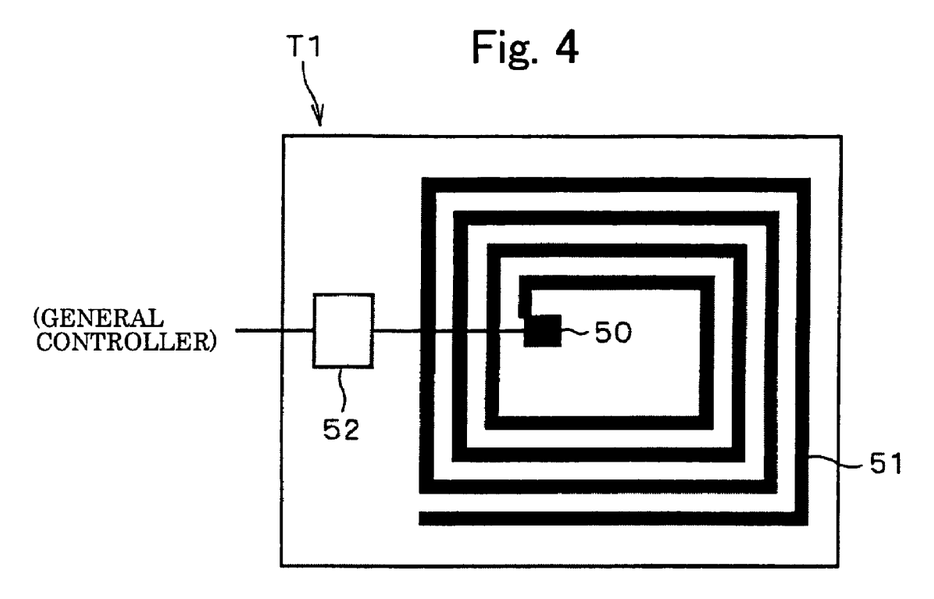
FIG. 4 is a plan view showing the structure of principal parts of an IC tag T1.

FIG. 4 is a plan view showing the structure of principal parts of an IC tag T1.

The IC tag T1 has a memory portion 50 that is composed as an IC chip and a spiral antenna 51.

Figure 5:
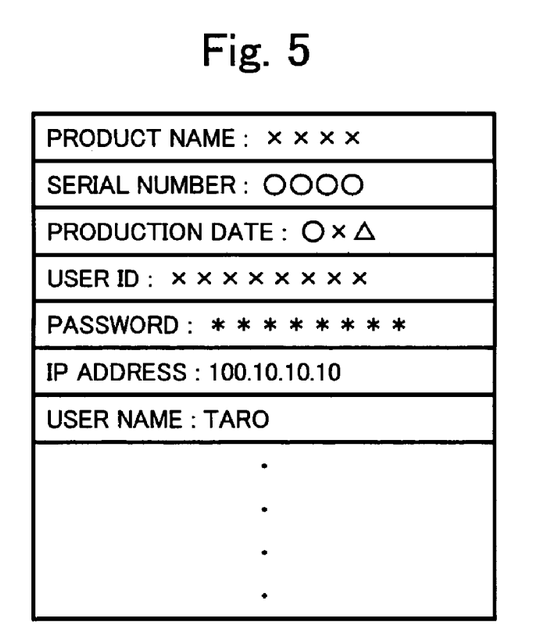
FIG. 5 is a figure for explaining information memorized in the IC tag T1.

The memory portion 50 memorizes information concerning the image taking apparatus 1 and information concerning a user as shown in FIG. 5.

The IC tag T1 is an active type one in which a power supply portion 52 with a battery is equipped. The IC tag T1 has advantages, as compared to the passive type IC tag T2 that will be described later, in that it enables long distance communication and in that information volume memorized in the memory portion 50 is large. Further, the IC tag T1 memorizes information that becomes necessary when connected with a network and the like.

The IC tag T1 can, by using a control signal from the general controller 40 that is electrically connected to the power supply portion 52, select whether information transmission from the antenna 51 is carried out or not.

The IC tag T1 is equipped at the position where it is covered by the sliding cover 17 when the sliding cover is at the nonuse position P2 (in FIG. 2) and where it is not covered by the sliding cover 17 when the sliding cover is at the use position P1 (in FIG. 1). Thereby, when the image taking apparatus 1 is in operation and the sliding cover 17 is at the use position P1, it becomes possible for the IC tag T1 to communicate. Meanwhile, when the image taking apparatus 1 is not in operation and the sliding cover 17 is at the nonuse position P2, it becomes impossible for the IC tag T1 to communicate, since the radio wave is shielded by the metallic sliding cover 17 that covers the IC tag T1.

Figure 6:
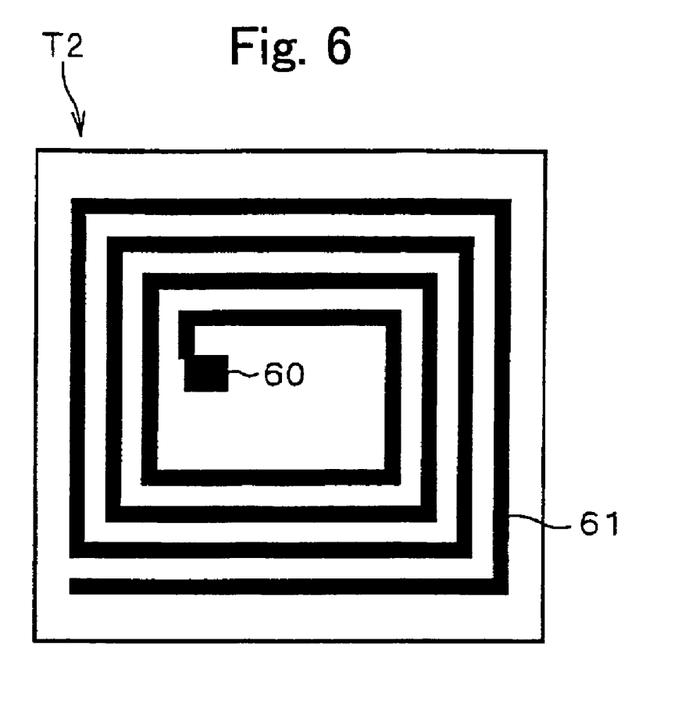
FIG. 6 is a plan view showing the structure of principal parts of the IC tag T2.

FIG. 6 is a plan view showing the structure of principal parts of the IC tag T2.

Figure 7:
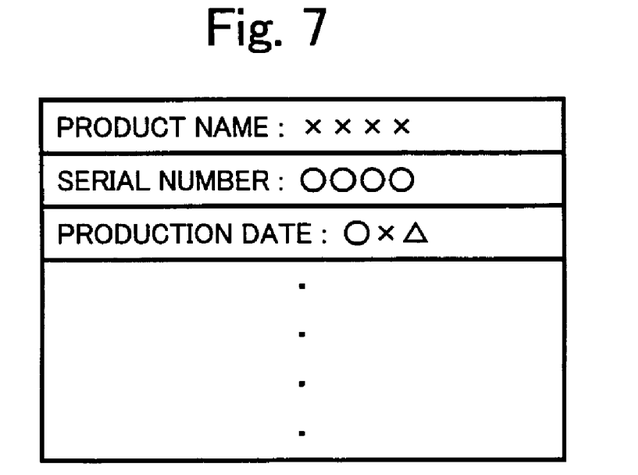
FIG. 7 is a figure for explaining information memorized in the IC tag T2.

The IC tag T2 has a memory portion 60 that memorizes information concerning the image taking apparatus 1 as shown in FIG. 7, and an antenna 61 that is similar to the one in the IC tag T1. The IC tag T2 is composed as a passive type IC tag that is not equipped with a power supply portion. Therefore, in the IC tag T2, information stored in the memory portion 60 is transmitted by using the energy of the radio wave that is sent from an external reader that reads information concerning the IC tag T2. The IC tag T2 can memorize a smaller information volume and provides a shorter communication range, as compared to the IC tag T1. Therefore, in the IC tag T2, only the product information of the image taking apparatus 1, for example, as the minimum information required for identification of the image taking apparatus 1 and for others (as shown in FIG. 7) is memorized, among all of the memorized information concerning the IC tag T1 (as shown in FIG. 5). On the other hand, since the IC tag T2 can communicate by the radio wave from the reader regardless of the operation status of the image taking apparatus 1, even when the image taking apparatus 1 cannot operate by any trouble, for example, the reader can receive the identification information of the image taking apparatus 1 and the like (in FIG. 7), so that such information can be utilized for services such as repair.

The IC tag T2 is equipped at the position where it is covered by the sliding cover 17 when the sliding cover is at the use position P1 (in FIG. 1) and where it is not covered by the sliding cover 17 when the sliding cover is at the nonuse position P2 (in FIG. 2). Thereby, when the image taking apparatus 1 is not in operation and the sliding cover 17 is at the nonuse position P2, it becomes possible for the IC tag T2 to communicate. Meanwhile, when the image taking apparatus 1 is in operation and the sliding cover 17 is at the use position P1, it becomes impossible for the IC tag T2 to communicate, since the radio wave is shielded by the metallic sliding cover 17 that covers the IC tag T2.

Operation of the image taking apparatus 1 having the IC tags T1 and T2 which have mutually different characteristics is described in the following.

<Operation of the Image Taking Apparatus 1>

Figure 8:
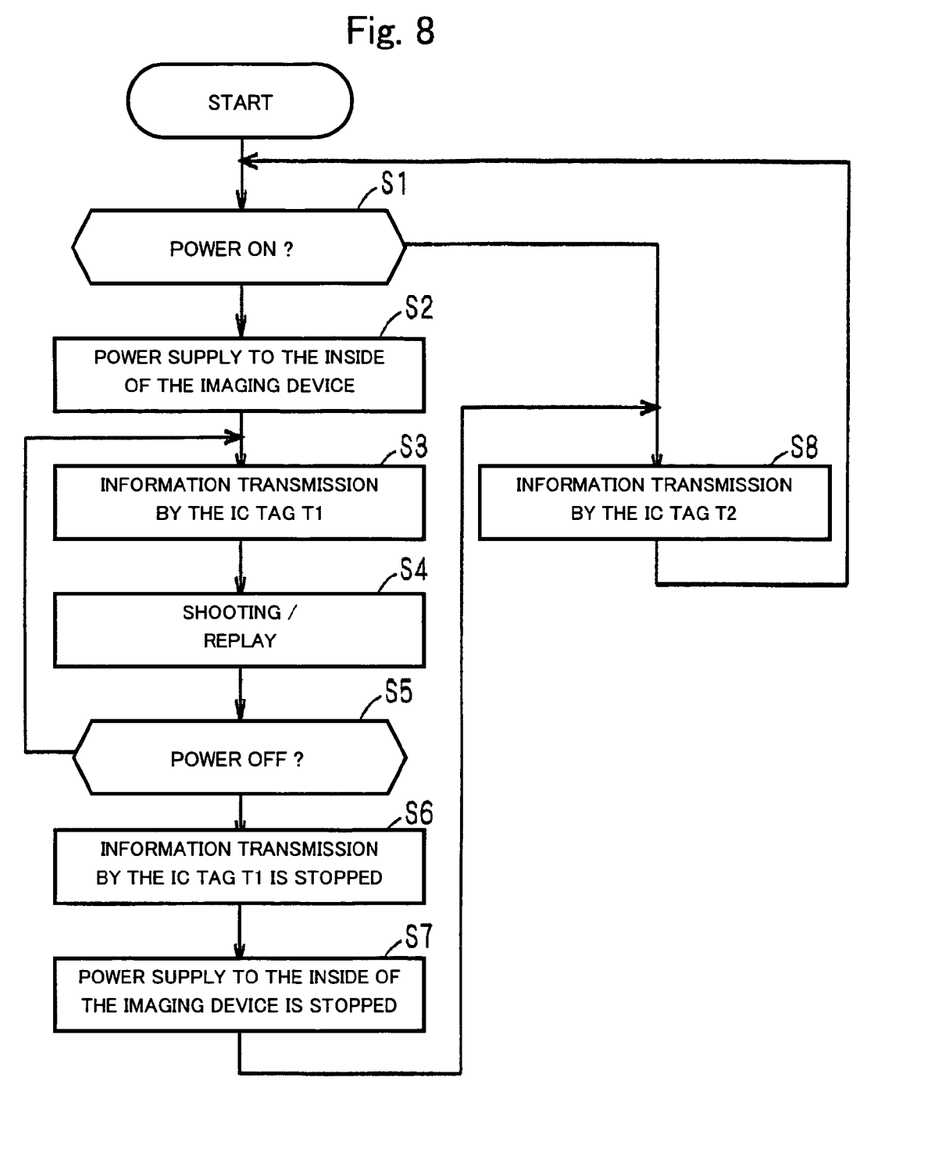
FIG. 8 is a flow chart showing fundamental operation of the image taking apparatus 1.

FIG. 8 is a flow chart showing fundamental operation of the image taking apparatus 1. The operation is performed by the general controller 40.

At the step S1, whether the power supply of the image taking apparatus 1 has been turned on or not by the action of a photographer on the power switch 19 is judged. When the power supply is turned on, after the sliding cover 17 is moved to the use position P1 shown in FIG. 1 by the photographer, the process advances to the step S2. When the power supply is not turned on, the process advances to the step S8.

At the step S2, the power source 41 supplies electric power to the inside of the image taking apparatus 1.

At the step S3, information transmission by the IC tag T1 is performed. More specifically, the general controller 40 activates the transmission function of the IC tag T1 so that information memorized in the memory portion 50 (refer to FIG. 5) can be transmitted. Thereby, it becomes possible for an external apparatus that has a reader to read information stored in the memory portion 50.

At the step S4, usual shooting, replay of recorded photographed images, and others are performed by the image taking apparatus 1.

At the step S5, whether the power supply of the image taking apparatus 1 has been turned on or not by the action of the photographer on the power switch 19 is judged. When the power supply is turned off, after the sliding cover 17 is moved to the nonuse position P2 shown in FIG. 2 by the photographer, the process advances to the step S6. When the power supply is not turned off, the process returns to the step S3.

At the step S6, information transmission by the IC tag T1 is stopped. More specifically, the general controller 40 deactivates the transmission function of the IC tag T1.

At the step S7, electric power supply to the inside of the image taking apparatus 1 is stopped.

At the step S8, information transmission by the IC tag T2 is performed. More specifically, information memorized in the memory portion 60 of the IC tag T2 (as shown in FIG. 7) becomes ready for transmission. Thereby, it becomes possible for the external apparatus that has the reader to read information in the memory portion 60.

Through operation described above, when the image taking apparatus 1 is not in use where the power supply is turned off, communication only by the passive type IC tag T2 becomes possible. On the other hand, when the image taking apparatus 1 is in use where the power supply is turned on, the IC tag T2 is covered by the metallic sliding covers 17, so that communication only by the active type IC tag T1 becomes possible. Namely, since the sliding cover 17 that covers the image taking lens system 30 moves only to one of two positions alternatively between the use position P1 (in FIG. 1) and the nonuse position P2 (in FIG. 2), one of the two IC tags is always covered by the sliding cover 17, so that the radio wave is shielded. Thereby, the problem that interference occurs if both of the IC tags T1 and T2 respond simultaneously to the radio wave from the reader so that the reader side cannot receive correct information from the IC tags can be avoided.

An example of information transmission systems to which the image taking apparatus 1 as described above is explained next.

Figure 9:
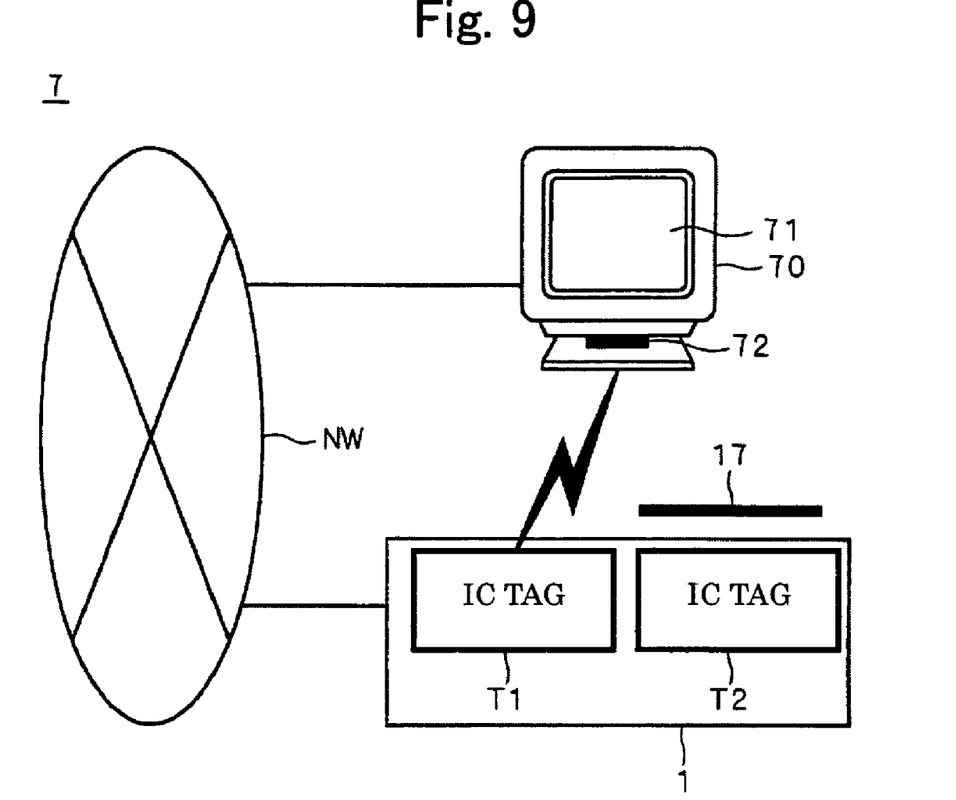
FIG. 9 is a conceptual diagram showing the structure of an information transmission system 7 having the image taking apparatus 1.

FIG. 9 is a conceptual diagram showing the structure of an information transmission system 7 having the image taking apparatus 1.

While the information transmission system 7 is equipped with the image taking apparatus 1 described above, it is also equipped with a digital television (DTV) 70 that is connected to the image taking apparatus 1 for communication through a network NW, a LAN, for example.

The DTV 70 is equipped with a display screen 71, as well as a reader 72 that can read information stored in the IC tags T1 and T2. For the DTV 70, when the image taking apparatus 1 is in operation, the IC tag T2 is covered by the sliding cover 17 as described already, so that information only from the IC tag T1 can be acquired.

According to the information transmission system 7 described above, after the DTV 70 has acquired and identified information concerning network connection (such as a user ID and a password as shown in FIG. 5) from the IC tag T1, for example, it becomes possible for the system to receive a photographed image memorized by the image taking apparatus 1 through the network NW and to display the image on the display screen 71.

When a plurality of image taking apparatus 1 that are equipped with a plurality of IC tags T1 and T2 exist in the neighborhood of the DTV 70, the DTV 70 may receive information from the plurality of image taking apparatus, which produces interfere. In such a case, in order to avoid interference, it is necessary to choose the image taking apparatus with which the DTV 70 should communicate. Thus, in the information transmission system 7, by turning on the power supply of the image taking apparatus 1 that should be communicated with and by opening its sliding cover 17, while by turning off power supplies of unnecessary image taking apparatus 1 that should not be communicated with and by closing their sliding covers 17, it becomes possible for the DTV 70 to communicate only with the IC tag T1 of the image taking apparatus 1 of which the power supply is turned on, enabling the solution to the interference problem. For example, if information concerning network connection is memorized in the IC tag T1, only the image from the specified image taking apparatus 1 can be replayed by the DTV 70.

According to the structure and the operation of the image taking apparatus 1 as described above, since information transmission of one of the two IC tags is disabled by the sliding cover that is opened or shut when the image taking apparatus is in use or not in use, interference in information transmission caused by a plural number of IC tags can be prevented. Since the image taking apparatus is equipped also with the passive type IC tag, even when the active type IC cannot communicate, in such a case as a battery is not loaded in the image taking apparatus or the image taking apparatus fails, it is possible for the external reader that is equipped, for example, in test equipment of a service center, to read camera identifying information that is required for image taking apparatus repair and the like.

<Alternatives>

According to the image taking apparatus in the embodiment described above, the power supply is turned on and off by the power switch 19. However, the power supply may be turned on and off in synchronization with opening and closing of the sliding cover. That is, a structure may be used wherein the power supply is automatically turned on when the sliding cover 17 is at the use position P1 as shown in FIG. 1, and the power supply is automatically turned off when the sliding cover 17 is at the nonuse position P2 as shown in FIG. 2.

The IC tag T1 in the embodiment described above receives electric power from the power supply in the IC tag T1. However, the IC tag T1 may receive electric power from the power source 41 in the image taking apparatus 1 (in FIG. 3).

Two IC tags T1 and T2 in embodiments described above are the combination of the active type and the passive type. However, type combination is not limited to the above, and two types of IC tags having mutually different frequency characteristics may be used instead. In this case, since the communication distance varies according to the frequency used, the frequency applied to the IC tag which can communicate when the image taking apparatus 1 is in use and in which information required for network connection is memorized may be set higher than the frequency applied to the other IC tag. Thereby, long distance communication becomes possible, so that convenience for network connection can be raised.

In the embodiments described above, the status of each of IC tags T1 and T2 is switched between exposed and covered. As a movable member, the sliding cover 17 (in FIG. 1) that covers the image taking lens system 30 and the photoflash 16 is used. However, a lens cover that covers only the image taking lens system may be used instead.

According to these embodiments, interference by a plurality of IC tags can be prevented.

Since a plurality of IC tags having mutually different characteristics are used, a proper choice of the plurality of IC tags according to the operation status of the image taking apparatus, in use or not in use, becomes possible.

Furthermore, according to these embodiments, equipment space can be reduced by utilizing such members as the lens cover, and since communication by the IC tag covered by the metallic lens cover is shielded, interference can be prevented perfectly.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image taking apparatus comprising:
    a movable member for moving between a first position and a second position in accordance with a condition of the image taking apparatus;
    a first IC tag for memorizing information concerning the imaging taking apparatus and that is disposed at a position that is covered with the movable member at said second position and that is not covered with the movable member at said first position; and
    a second IC tag for memorizing information concerning the imaging taking apparatus and that is disposed at a position that is covered with the movable member at said first position and that is not covered with the movable member at said second position,
    wherein said movable member is positioned at said first position when the imaging taking apparatus is in use and that is positioned at said second position when the imaging taking apparatus is not in use.

2. The image taking apparatus according to claim 1, wherein said first IC tag and said second IC tag have mutually different characteristics.

3. The image taking apparatus according to claim 2, wherein said first IC tag has a power source and said second IC tag does not have a power source.

4. The image taking apparatus according to claim 2, wherein frequency characteristics of said first IC tag and said second IC tag are mutually different, and said first IC tag uses a frequency higher than one for said second IC tag.

5. The image taking apparatus according to claim 2, wherein the information amount memorized in said first IC tag is larger than the information amount memorized in said second IC tag.

6. The image taking apparatus according to claim 5, wherein said first IC tag memorizes information to connect the image taking apparatus to a network.

7. The image taking apparatus according to claim 1, wherein said movable member is a member for shielding a radio wave.

8. The image taking apparatus according to claim 7, wherein said movable member is a metallic cover.

9. An image taking apparatus comprising:
    a first IC tag for memorizing a first information concerning the imaging taking apparatus and that is capable of transmitting the first information to an external device when the image taking apparatus is in an operation state;
    a second IC tag for memorizing a second information concerning the imaging taking apparatus and that is capable of transmitting the second information to an external device when the image taking apparatus is not in an operation state; and
    a switching member for switching between an operation of said first IC tag and that of said second IC tag.

10. The image taking apparatus according to claim 9, wherein said switching member is a power switch.

11. The image taking apparatus according to claim 9, wherein said switching member is a lens cover.

12. The image taking apparatus according to claim 9, wherein said first IC tag and said second IC tag have mutually different characteristics.

13. The image taking apparatus according to claim 12, wherein said first IC tag has a power source and said second IC tag does not have a power source.

14. The image taking apparatus according to claim 12, wherein frequency characteristics of said first IC tag and said second IC tag are mutually different, and said first IC tag uses a frequency higher than one for said second IC tag.

15. The image taking apparatus according to claim 12, wherein the information amount memorized in said first IC tag is larger than the information amount memorized in said second IC tag.

16. The image taking apparatus according to claim 15, wherein said first IC tag memorizes information concerning to a network communication.

17. A method of transmitting information concerned with an image taking apparatus by using a plurality of IC tags, comprising the steps of:
    setting the image taking apparatus in a first condition;
    transmitting information memorized in a first IC tag to an external device when the image taking apparatus is in first condition;
    setting the image taking apparatus in a second condition; and
    transmitting information memorized in a second IC tag to an external device when the image taking apparatus is in second condition,
    wherein said first condition is in power on state and said second condition is in power off state.

18. The method of information transmitting according to claim 17, wherein said first IC tag and said second IC tag have mutually different characteristics.

* * * * *